(12) United States Patent
Hourigan

(10) Patent No.: US 11,988,322 B2
(45) Date of Patent: May 21, 2024

(54) TRIPOD DESIGN AND MANUFACTURE

(71) Applicant: Braden Hourigan, Entiat, WA (US)

(72) Inventor: Braden Hourigan, Entiat, WA (US)

( * ) Notice: Subject to any disclaimer, the term of this patent is extended or adjusted under 35 U.S.C. 154(b) by 0 days.

(21) Appl. No.: 17/832,017

(22) Filed: Jun. 3, 2022

(65) Prior Publication Data
US 2023/0392746 A1 Dec. 7, 2023

(51) Int. Cl.
*F16M 11/32* (2006.01)

(52) U.S. Cl.
CPC .................................... *F16M 11/32* (2013.01)

(58) Field of Classification Search
CPC ...... F16M 11/32; F16M 11/34; F16M 11/242; F16B 7/1418; F16B 7/1454
See application file for complete search history.

(56) References Cited

U.S. PATENT DOCUMENTS

| | | | | |
|---|---|---|---|---|
| 4,174,900 A * | 11/1979 | Ina | ........................ | F16M 11/32 403/109.5 |
| 4,185,936 A * | 1/1980 | Takahashi | ............. | F16B 7/1454 248/188.5 |
| 4,596,484 A * | 6/1986 | Nakatani | ................ | F16M 11/28 403/109.5 |
| 4,932,622 A * | 6/1990 | Hayakawa | ............. | F16M 11/32 248/188.5 |
| 5,082,222 A * | 1/1992 | Hsu | ........................ | F16M 11/16 248/170 |
| 5,267,712 A * | 12/1993 | Shen | ................... | F16M 11/2064 396/428 |
| 6,322,027 B1 * | 11/2001 | Hsu | ........................ | F16M 11/34 248/188.7 |
| 6,824,319 B1 * | 11/2004 | Speggiorin | ............. | F16C 11/10 396/428 |
| 9,109,616 B1 * | 8/2015 | Ballentine | ............. | F16B 7/1454 |
| 11,221,544 B1 * | 1/2022 | York | ...................... | F16M 11/24 |
| 11,493,168 B1 * | 11/2022 | Stabler | .................... | F16B 7/042 |
| 2002/0030146 A1 * | 3/2002 | Akaike | .................. | F16M 11/32 248/188.5 |
| 2003/0146354 A1 * | 8/2003 | Speggiorin | ............ | F16M 11/32 248/167 |
| 2005/0161561 A1 * | 7/2005 | Hsieh | ........................ | H04R 1/08 248/171 |
| 2007/0090237 A1 * | 4/2007 | Hsu | ........................ | F16M 11/14 248/177.1 |
| 2008/0224000 A1 * | 9/2008 | Yang | ...................... | F16M 11/16 248/163.1 |
| 2009/0250567 A1 * | 10/2009 | Raynaud | ................ | F16M 11/16 248/168 |

(Continued)

*Primary Examiner* — Christopher Garft
(74) *Attorney, Agent, or Firm* — BakerHostetler

(57) ABSTRACT

A tripod may be provided herein with nesting flip locks on inside faces of the tripod legs. The tripod may comprise a hub and a plurality of telescoping legs. Each of the telescoping legs may be coupled, at a proximal end of each of the plurality of legs, to the hub. Each of the plurality of legs may comprise a plurality of hollow leg sections and at least one nesting flip lock. The nesting flip lock may be coupled to an inward-facing side of one hollow leg section of the plurality of hollow leg sections. The nesting flip lock may comprise a collar coupled to a distal end of the one hollow leg section and a lever coupled to the collar, wherein the lever may comprise a cam mechanism to manage an engagement and disengagement of the nesting flip lock.

19 Claims, 16 Drawing Sheets

(56) References Cited

U.S. PATENT DOCUMENTS

| | | | |
|---|---|---|---|
| 2010/0019109 A1* | 1/2010 | Liu | F16M 11/046 |
| | | | 248/188 |
| 2010/0108832 A1* | 5/2010 | Zen | F16M 11/32 |
| | | | 248/177.1 |
| 2013/0119656 A1* | 5/2013 | Lee | F16L 37/18 |
| | | | 285/308 |
| 2014/0090681 A1* | 4/2014 | Lovley, II | E04H 15/50 |
| | | | 135/140 |
| 2015/0139717 A1* | 5/2015 | Bukovitz | F16B 7/1454 |
| | | | 403/109.5 |
| 2015/0346589 A1* | 12/2015 | Dering | G03B 17/561 |
| | | | 396/428 |
| 2016/0186791 A1* | 6/2016 | Lee | F16M 13/02 |
| | | | 248/188.5 |
| 2016/0201706 A1* | 7/2016 | Heim | A63C 11/221 |
| | | | 403/110 |
| 2017/0146891 A1* | 5/2017 | Chen | G03B 17/561 |
| 2018/0324360 A1* | 11/2018 | Gabrielli | F16M 11/16 |
| 2019/0003635 A1* | 1/2019 | Li | F16M 11/242 |
| 2020/0081325 A1* | 3/2020 | Zhu | F16M 11/08 |
| 2020/0363008 A1* | 11/2020 | Jankura | F16M 11/04 |
| 2020/0363703 A1* | 11/2020 | Jankura | F16M 11/14 |
| 2020/0400270 A1* | 12/2020 | Lu | F16M 11/32 |
| 2021/0109425 A1* | 4/2021 | Jankura | F16M 11/18 |
| 2021/0345782 A1* | 11/2021 | Solli | F16B 7/1454 |
| 2021/0396257 A1* | 12/2021 | Buckley | F16B 7/1427 |

\* cited by examiner

410

TRIPOD DESIGN AND MANUFACTURE

BACKGROUND

Tripods are used in various industries to stabilize optics, ranging from photography, to construction, binoculars, spotting scopes, telescopes, and the like. Different configurations of tripods come with different benefits and costs. For example, one common type of tripod uses a "flip lock" mechanism with locks on the outside of telescoping tripod legs to unlock and lock the telescoping tripod legs. As the name implies, the flip lock employs a lever that can be flipped opened to allow the telescopic leg to extend or retract, and the lever can be flipped closed to lock the telescopic legs in place. Benefits of the flip lock include ease of use and speed of deployment of the legs. However, flip locks come with some downsides. For example, the flip lock lever may become snagged when retrieving the tripod from a bag. Such snagging is inconvenient. Additionally, snags may occur when transporting the tripod in the open, such as snagging the lever on a passing tree branch. Such snagging can cause a tripod leg to deploy unintentionally, which can lead to inconvenience and/or permanent damage to the tripod leg. Flip locks also add extra bulk to a tripod because flip locks are typically seated on an outward-facing side of a telescoping leg. While in a collapsed configuration (e.g., the telescoping legs fully retracted and packed in against one another), the flip locks may protrude from the outside of the collapsed design. Flip locks on the outward-facing side of the telescoping leg are subject to damage from impacts, dirt, and debris.

Another example of tripod leg locks includes a "twist lock" mechanism to unlock and lock telescoping tripod legs in place. As the name implies, the lock comprises a twistable collar mechanism that, when twisted in a first direction, loosens to allow the telescopic leg to extend or retract, and the collar mechanism, when twisted in a second direction, tightens to lock the telescopic legs in place. While the twist locks may be less susceptible to snagging compared to flip locks due to the absence of a lever, the twist locks may be more complex to maintain and operate, and they may be less convenient to operate than flip locks. Furthermore, twist locks are limited to use on circular legs, so different leg shapes cannot utilize twist locks.

SUMMARY

Systems, methods, and devices are described herein for providing a tripod with nesting flip locks on the inside of tripod legs. A tripod may comprise a central hub and a plurality of telescoping legs coupled, at a proximal end of each leg, to the central hub. Each one of the plurality of telescoping legs may comprise a plurality of hollow leg sections. At least one nesting flip lock may be coupled to the inward-facing side of one of the plurality of hollow leg sections. The nesting flip lock may comprise a collar coupled to a distal end of the hollow leg section and a lever coupled to the collar, wherein the lever comprises a cam mechanism configured to engage and disengage the flip lock.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of the disclosure.

BRIEF DESCRIPTION OF THE DRAWINGS

Aspects of the disclosure will now be described in detail with reference to the drawings, wherein like reference numbers refer to like elements throughout, unless specified otherwise.

DETAILED DESCRIPTION

In order to increase the usability of a tripod, while reducing downsides, a tripod may be configured with nesting flip locks on the inward-facing sides of the legs. Additionally, to increase the versatility of the tripod, a modular center column may be provided with a detachable and/or removable center tube. A top plate and a hook that are typically found at the top and bottom, respectively, of a center column may be removable from the center tube, and the top plate and the hook may be configured to attach to one another directly, such as with a threaded connection.

Figure 1:
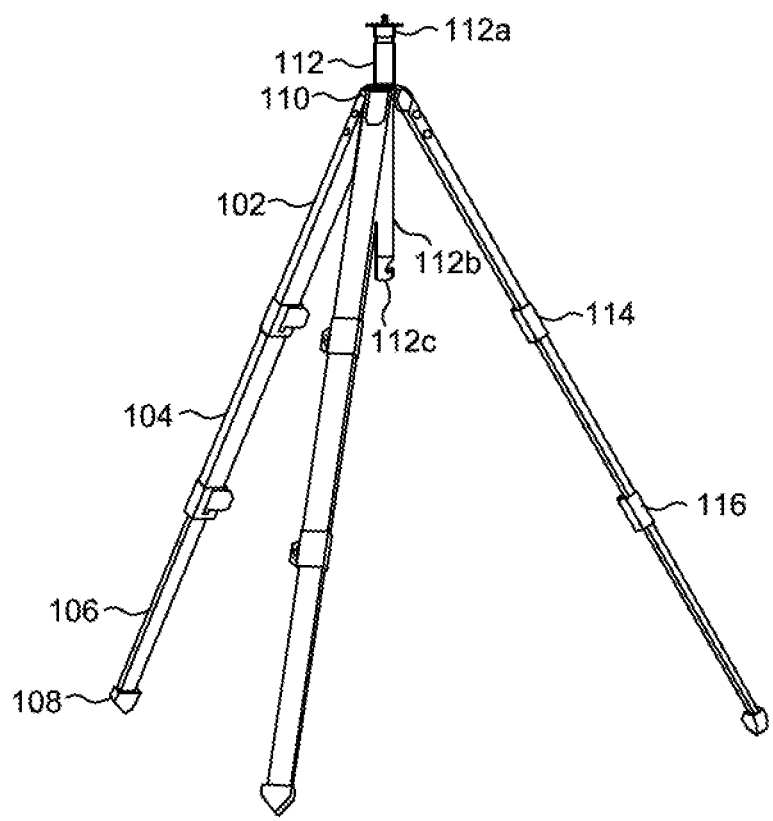
FIG. 1 shows an expanded view of one implementation of the subject technology.

FIG. 1 shows an example tripod 100 according to one implementation described herein. FIG. 1 shows an example of the tripod 100 in an extended configuration. For example, the tripod shown may be prepared to attach an optical device, such as a telescope or pair of binoculars, and the tripod may be in a configuration to provide stability to a user operating the attached optical device.

As shown in FIG. 1, a hub 110 may be a central piece configured to substantially couple to each other piece of the tripod. For example, the hub 110 may be coupled to a plurality of legs (e.g., outer leg 102). The hub 110 may be coupled to three outer legs 102, as shown, though the hub may be configured to couple to less than, or more than, three legs in other implementations. The outer leg 102 may be a hollow leg. The outer leg may be coupled to a middle leg 104. The middle leg 104 may be a hollow leg. The middle leg 104 may be the same length as outer leg 102, shorter than outer leg 102, or longer than outer leg 102. The middle leg 104 may be smaller than outer leg 102 cross-sectionally, such that middle leg 104 may slide into the hollow portion of outer leg 102 in a collapsed configuration. Additionally, the example shown, middle leg 104 is in an at least partially extended configuration. In the extended configuration example, middle leg 104 is partially revealed from outer leg 102, though a portion of middle leg 104 may still be inside the hollow portion of outer leg 102. Middle leg 104 may slide in and out of outer leg 102 in a telescoping motion. When extended, middle leg 104 provides additional height to the tripod 100.

The middle leg 104 may be coupled to inner leg 106. The inner leg 106 may be the same length as middle leg 104 and/or outer leg 102, shorter than middle leg 104 and/or outer leg 102, or longer than middle leg 104 and/or outer leg 102. The inner leg 106 may be smaller than middle leg 104 cross-sectionally, such that inner leg 106 may slide into the hollow portion of middle leg 104 in a collapsed configuration. The inner leg 106 may be hollow, or the inner leg 106 may be at least partially or fully solid. The inner leg 106 may be the smallest leg cross-sectionally when compared to the middle leg 104 and the outer leg 102. As shown in FIG. 1, inner leg 106 is in an at least partially extended configuration. In the extended configuration example, inner leg 106 is at least partially revealed from middle leg 104, though a portion of inner leg 106 may still be inside the hollow portion of middle leg 104. Inner leg 106 may slide in and out of middle leg 104 in a telescoping motion. When extended, inner leg 106 may provide additional height to the tripod 100.

The middle leg 104 and inner leg 106 are independently telescoping. For example, inner leg 106 may be in a collapsed configuration while middle leg 104 is in an extended configuration. In another example, inner leg 106 may be in an extended configuration and middle leg 104 may be in a collapsed configuration. In a further embodiment, the middle leg 104 may be smaller cross-sectionally than the inner leg 106 and the middle leg 104 may be larger cross-sectionally than the outer leg 102 such that the telescoping motion is reversed with outer leg 102 sliding in and out of middle leg 104 and middle leg 104 sliding in and out of inner leg 106.

The outer leg 102 may be coupled to the hub 110 at a proximal end of the outer leg 102. The outer leg 102 may be coupled to the middle leg 104 at a distal end of the middle leg 104. The middle leg may be coupled to the outer leg 102 at a proximal end of the middle leg 104. The middle leg 104 may be coupled to an inner leg 106 at a distal end of the middle leg 104. The inner leg 106 may be coupled to the inner leg 104 at a proximal end of the inner leg 106. The inner leg 106 may be coupled to a foot 108 at a distal end of the inner leg 106.

A foot 108 may be attached to the distal end of the inner leg 106. The foot 108 may comprise any type of material or shape, and the foot 108 may provide any number of functionalities. For example, the foot 108 may be made of rubber, soft plastic, or any other type of material that provides grip. In the example, the foot 108 may be made of rubber to provide grip to the tripod 100 when the tripod is deployed. For example, the tripod 100 may be deployed on a wooden floor inside a building. The rubber foot, or the like, may provide sufficient grip to provide a stable platform for an optical device. In another example, the foot 108 may comprise a metal foot with a pointed tip. The pointed tip may allow the foot 108 to dig into the ground in softer materials, such as sand or soil. For example, the tripod may be deployed in a field, and foot 108 may provide sufficient stabilization for using an optical device, such as a telescope.

In yet another example, the legs may be deployed to different lengths. For example, on an uneven surface, such as a mountainside, the ground may not be perfectly flat. Deploying the legs to different lengths may provide a stable and flat surface for the hub 110, such that any optical device attached to the tripod may have a sufficiently flat surface to view from.

The center column 112 may comprise a plurality of parts. In one example, as shown in FIG. 1, the center column 112 may be fully assembled. The center column 112 may comprise a top plate 112a, a center tube 112b, and a hook 112c. The top plate 112a may comprise any number of connection points to couple directly to an optical device. For example, the top plate may comprise a threaded post. The top plate may comprise any attachment mechanism known to those skilled in the art. The top plate may also comprise a flat plate portion. The flat plate portion may extend outward from the connection point, such as the threaded post. The flat plate may provide extra stability to an optical device attached to the top plate 112a. The top plate 112a may be coupled to a center tube 112b. The top plate 112a and the center tube 112b may be coupled via a threaded connection, or by any other suitable connection. The center tube may act as an additional source of height for the tripod 100. For example, when the tripod is deployed, the legs may have a maximum extension point when middle leg 104 and inner leg 106 are fully deployed. However, a user may desire a higher vantage point for an optical device than that allowed for by the fully extended legs. In that case, the center column 112 may be raised up to provide additional height to the connection point between the top plate 112a and an optical device. The center column 112 may be removably fixed in place at a desired height via an arresting mechanism. For example, an arresting mechanism may comprise a screw coupled with a threaded hole through a side of the hub 110. The screw may be tightened to produce friction against a side of the center column 112, causing the center column 112 to be fixed in place. The arresting mechanism may be a thumb screw, a screw, a magnet, a spring-tensioned post, or the like. As shown in FIG. 1, at the bottom of the center tube 112b, a hook 112c is coupled to the center tube 112b. For example, the center tube 112 and the hook 112c may be coupled via a threaded connection. The hook 112c may provide a hook for a weight. The weight may be hung from the hook to provide additional stability to the tripod 100, for example during high winds or on an uneven surface. The top plate 112a, the center tube 112b, and the hook 112c are fully detachable. For example, the center tube 112 b may be detached from the top plate 112a and the hook 112c. The top plate 112a and the hook 112c may be attached directly to one another via the same mechanism that allows attachment to the center tube 112b. Thus, the tripod 100 may be used without the center tube 112b, for example when a lighter-weight tripod is desired, or when a user wishes to use the tripod in a height that is so short that the center tube 112b prevents the desired height of the tripod 100.

The outer leg 102 may be connected, at a proximal end, to the hub 110. The outer leg 102 may be coupled to a first nesting flip lock 114. The first nesting flip lock 114, as described in further detail herein, allows for the middle leg 104 to be locked into place with respect to the outer leg 102.

For example, the middle leg 104 may be locked into place in a collapsed configuration, in which the middle leg 104 is encompassed within the hollow portion of the outer leg 102, or the middle leg 104 may be locked into place in an extended configuration, in which the middle leg 104 is at least partially revealed from the hollow portion of the outer leg 102.

The middle leg 104 may be in communication with, at a proximal end, to the outer leg 102. The middle leg 104 may be coupled, at a distal end, to a second nesting flip lock 116. The second nesting flip lock 116, as described in further detail herein, allows for the inner leg 106 to be locked into place with respect to the middle leg 104. For example, the inner leg 106 may be locked into place in a collapsed configuration, in which the inner leg 106 is encompassed within the hollow portion of the middle leg 104, or the inner leg 106 may be locked into place in an extended configuration, in which the inner leg 106 is at least partially revealed from the hollow portion of the middle leg 104.

Figure 2:
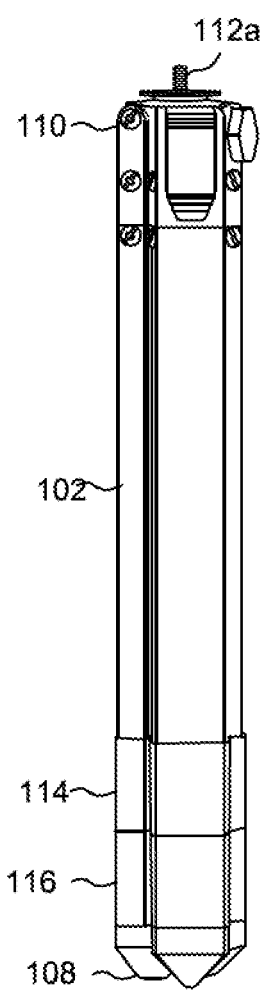
FIG. 2 shows a collapsed view of one implementation of the subject technology.

FIG. 2 shows an example tripod in a collapsed state 200. For example, a tripod hub 110 may be coupled to a plurality of tripod legs and to a center column 112 (not shown). The center column 112 may be in a retracted position, and the top plate 112a may be the only visible feature, of the center column 112, above the hub 110.

In the example shown in FIG. 2, each leg of the plurality of legs is in a collapsed configuration. For example, outer leg 102 is visible, while middle leg 104 may be locked into place within the hollow portion of outer leg 102, and inner leg 106 may be locked into place within the hollow portion of the middle leg 104. The first nesting flip lock 114 coupled to outer leg 102 may be visible at a distal end of the outer leg 102. While the inner leg 106 is retracted into the hollow portion of middle leg 104, the second nesting flip lock 116 may be resting at least partially against the first nesting flip lock 114.

In one example, each of the plurality of legs may be collapsed into a folded configuration, reducing the amount of space taken up by the tripod in the collapsed state 200. Though not visible, each nesting flip lock lever may be positioned on the inside of the collapsed leg sections. Thus, the flip lock levers are positioned in a way that reduces the chance of the levers snagging or getting caught on other items accidentally.

Figure 3:
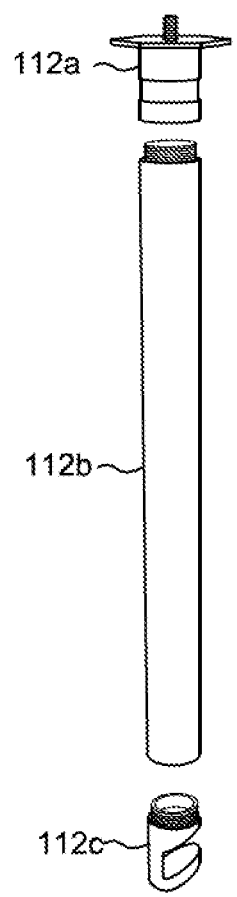
FIG. 3 shows of a modular center column in accordance with one or more implementations.

FIG. 3 shows an example modular center column 112. The modular center column 112 may comprise a top plate 112a, a center tube 112b, and a hook 112c. The top plate 112a may comprise any number of connection points to couple directly to an optical device. For example, the top plate may comprise a threaded post. The top plate 112a may comprise any attachment mechanism known to those skilled in the art. The top plate 112a may be a static, flat surface. The top plate 112a may comprise a ball head, a pan head, a tilt head, a fluid head, a gimbal head, or any other suitable head to couple with optical devices. In one example, the top plate 112a may also comprise a flat plate portion. The flat plate portion may extend outward from the connection point, such as the threaded post. The flat plate may provide stability to an optical device attached to the top plate 112a. The top plate 112a may be coupled to a center tube 112b. The top plate 112a and the center tube 112b may be coupled via a threaded connection, or by any other suitable connection. The center tube may act as an additional source of height for the tripod 100. For example, when the tripod is deployed, the legs may have a maximum extension point when middle leg 104 and inner leg 106 are fully deployed. However, a user may desire a higher vantage point for an optical device than that allowed for by the fully extended legs. In that example, the center tube 112b may be raised up to provide additional height to the connection point between the top plate 112a and the optical device. At the bottom of the center tube 112b, a hook 112c may be coupled to the center tube 112b. For example, the center tube 112 and the hook 112c may be coupled via a threaded connection. The hook 112c may provide a hook for a weight. The weight may be hung from the hook to provide additional stability to the tripod 100, for example during high winds or on an uneven surface. The top plate 112a, the center tube 112b, and the hook 112c may be fully detachable. For example, the center tube 112 b may be detached from the top plate 112a and the hook 112c. The top plate 112a and the hook 112c may be attached directly to one another via the same mechanism that allows attachment to the center tube 112b. For example, a threaded connection may allow the top plate 112a and the hook 112c to couple together. Thus, the tripod 100 may be used without the center tube 112b, for example when a lighter-weight tripod is desired, or when a user wishes to use the tripod at a height that is shorter than the center tube 112b.

Figure 4:
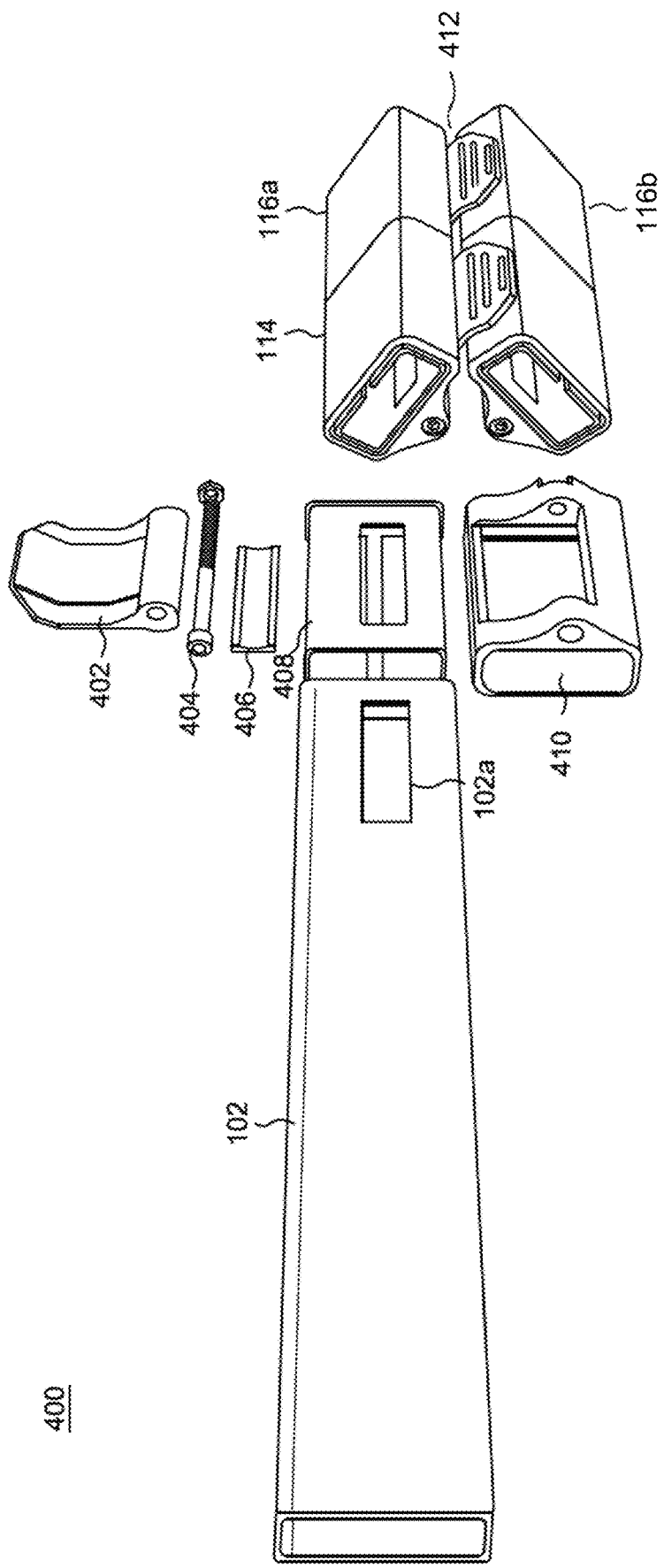
FIG. 4 shows a first exploded view of a leg and nesting flip lock in accordance with one or more implementations.

FIG. 4 shows an example of a nesting flip lock in an exploded view. Each part of the nesting flip lock is shown individually, and each part of the nesting flip lock may be coupled together to form the functioning nesting flip lock. The parts of the exploded nesting flip lock may be in reference to the first nesting flip lock 114 or the second nesting flip lock 116. However, though only two nesting flip locks are described in the drawings, and though only three hollow leg sections 102, 104, and 106 are described in the drawings, any number of nesting flip locks and any number of hollow leg sections may be used in the tripod 100. For example, the tripod 100 may comprise four hollow leg sections and three nesting flip locks.

A flip lock lever 402 is described herein. The flip lock lever 402 comprises an arm and a cam mechanism. For example, the flip lock lever 402 shows an arm. The arm may be used to apply force to move the lever, either to lock or to unlock the nesting flip lock 114. The arm may be straight, the arm may be curved, or the arm may be angled. In the example shown, the arm comprises a straight portion proximal to the cam mechanism and an angled portion distal to the cam mechanism. The angled portion is configured to nest with another nesting flip lock attached to another leg section while the tripod 100 is in the collapsed configuration. For example, the flip lock lever tip 412 is associated with a flip lock lever of the second nesting flip lock 116a. The flip lock lever tip 412 is configured at an angle to nest against the second nesting flip lock 116b associated with a different leg of the tripod 100. Thus, the angled flip lock lever tip 412 may extend the length of the flip lock lever (e.g., 402) to provide greater ease of access to operating the flip lock lever, while nesting the flip lock lever tip 412 substantially against a different leg of the tripod to reduce the likelihood of the flip lock lever tip 412 sticking out from the tripod 100, for example to reduce a chance of the flip lock lever tip 412 from snagging on another item during transport of the tripod. The flip lock lever 402 also comprises a cam mechanism at a proximal portion of the flip lock lever 402. As shown in FIG. 4, the cam mechanism comprises an eccentric cam. For example, the hole in the cam mechanism may be offset from the center of the cam mechanism. Thus, when the flip lock lever 402 is in a first position, the cam mechanism may press against a latch shim 406, compressing the latch shim 406 and locking the nesting flip lock 114. However, when the flip lock lever 402 is in a second position, the cam mechanism may be configured to reduce a pressure against the latch shim 406, thus allowing the middle leg 104 to slide freely within the outer leg 102.

The bolt 404 may couple the flip lock lever 402 to the collar 410. For example, the bolt 404 may pass through a first hole in the collar 410, then pass through the length of the hole in the cam mechanism portion of the flip lock lever 402, and then pass through a second hole on an opposite side of the collar 410. Thus, the flip lock lever 402 may be attached to the collar 410.

Though FIG. 4 is shown with respect to outer leg 102, the examples shown are also reproduced with respect to middle leg 104. That is, the first nesting leg lock 114, coupled to a distal end of outer leg 102, and a second nesting leg lock 116, coupled to a distal end of middle leg 104, are comprised of substantially the same parts and features. While the sizes and shapes of the first and second nesting leg locks may differ, the locking mechanism remains similar.

The leg shim 408 may be coupled to an inside of the hollow portion of outer leg 102. The leg shim 408 may have smaller cross-sectional dimensions than the outer leg 102 to allow for the leg shim 408 to couple to the inside of outer leg 102, but the leg shim 408 may have larger cross-sectional dimensions than the middle leg 104. Thus, the leg shim 408 may be attached to the inside of the hollow portion of outer leg 102, and the middle leg 104 may be slid into the inside of the leg shim 408. Thus, the middle leg 104 can slide into the hollow portion of outer leg 102 and the leg shim 408 may sit in between the outer leg 102 and the middle leg 104. The leg shim 408 may comprise a rectangular cut-out hole. Though the hole is shown to be rectangular, the hole may comprise any shape, such as circular, square, triangular, oval, or the like.

The outer leg 102 may comprise a rectangular cut-out hole 102a. The hole 102a is shown to be rectangular in FIG. 4, though the hole 102a could be circular, oval, square, triangular, or the like. The hole 102a in outer leg 102 and the rectangular cut-out hole in the leg shim may be positioned such that the holes align while the leg shim 408 is attached to the inside of the hollow portion of the outer leg 102. Thus, while the leg shim 408 is attached to the outer leg 102, the hole 102a and the rectangular cut-out hole in the leg shim 408 may substantially align.

The latch shim 406 may comprise a rectangular piece of material. The material may be metal, plastic, ceramic, or any other suitable material. The latch shim may be flat on a first side, and the latch shim 406 may be concave on a second side opposite the first side. In the first nesting flip lock 114, the latch shim 406 may be located in the rectangular opening created by the alignment of hole 102a and the rectangular cut-out hole in the leg shim 408. While the middle leg 104 is disposed inside outer leg 102, an outer side of middle leg 104 will act as a solid surface to prevent the latch shim 406 from falling into the middle of the hollow portion of the outer leg 102. For example, while the latch shim 406 is disposed in the hole 102a, the latch shim will rest against an outside face of the middle leg 104, and the latch shim 406 will be disposed in the space created by the hole 102a and the rectangular cut-out hole in the leg shim 408.

The collar 410 may be coupled to the outside of the outer leg 102. The collar 410 may have a large cut-out section on a face associated with the hole 102a. Thus, the large cut-out section of the collar may expose the hole 102a and the latch shim 406. The flip lock lever 402 may interact with and compress the latch shim when the flip lock lever 402 is in a locked state. For example, when the flip lock lever 402 is engaged in a locked state, the cam mechanism may cause the barrel of the flip lock lever to extend further toward the center of the outer leg 102 than when the flip lock lever 402 is disengaged in an unlocked state. In the described example, the barrel, in the locked state, may press against the latch shim 406. The pressure from the barrel of the flip lock lever 402 may compress the latch shim 406 against the middle leg 104. While the latch shim 406 is compressed against the middle leg 104, the middle leg 104 may be immobilized, and the middle leg 104 may not be able to slide freely within the hollow portion of the outer leg 102. When the flip lock lever 402 is in a disengaged, unlocked state, the cam mechanism may cause the barrel of the flip lock lever 402 to move farther away from the latch shim 406. For example, the barrel may move away from the latch shim 406 and the latch shim 406 may no longer be compressed by the barrel of the flip lock lever 402. In the described example, the latch shim 406 may float freely within the hole 102a and rectangular cut-out hole in the leg shim 408, releasing the pressure against the middle leg 104. In the described example, the middle leg 104 may slide freely within the hollow portion of the outer leg 102.

Figure 5:
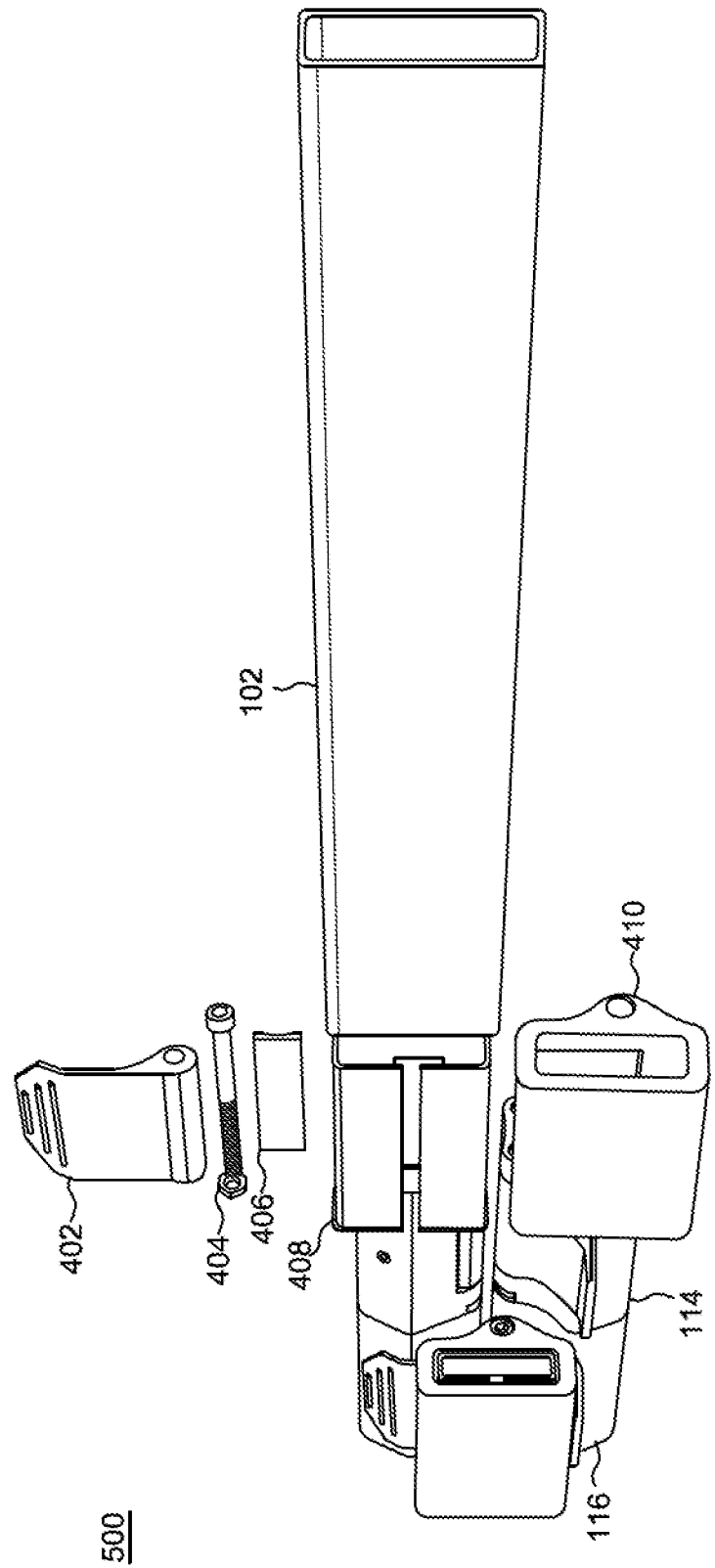
FIG. 5 shows a second exploded view of the leg and nesting flip lock in accordance with one or more implementations.

FIG. 5 shows an example of a nesting flip lock in an exploded view from a different perspective than shown in FIG. 4. Each part of the nesting flip lock is shown individually, and each part of the nesting flip lock may be coupled together to form the functioning nesting flip lock. The parts of the exploded nesting flip lock may be in reference to the first nesting flip lock 114 or the second nesting flip lock 116. However, though only two nesting flip locks are described in the drawings, and though only three hollow leg sections 102, 104, and 106 are described in the drawings, any number of nesting flip locks and any number of hollow leg sections may be used in the tripod 100. For example, the tripod 100 may comprise four hollow leg sections and three nesting flip locks.

A flip lock lever 402 is described herein. The flip lock lever 402 comprises an arm and a cam mechanism. For example, the flip lock lever 402 shows an arm. The arm may be used to apply force to move the lever, either to lock or to unlock the nesting flip lock 114. The arm may be straight, the arm may be curved, or the arm may be angled. In the example shown, the arm comprises a straight portion proximal to the cam mechanism and an angled portion distal to the cam mechanism. The angled portion is configured to nest with another nesting flip lock attached to another leg section while the tripod 100 is in the collapsed configuration. The flip lock lever 402 also comprises a cam mechanism at a proximal portion of the flip lock lever 402. As shown in FIG. 5, the cam mechanism comprises an eccentric cam. However, any suitable cam mechanism may be used. In one example, the hole in the cam mechanism may be offset from the center of the cam mechanism. Thus, when the flip lock lever 402 is in a first position, the cam mechanism may press against a shim 406, compressing the shim and locking the nesting flip lock 114. However, when the flip lock lever 402 is in a second position, the cam mechanism may be configured to reduce or remove a pressure against the latch shim 406, allowing the middle leg 104 to slide within the outer leg 102.

The bolt 404 may couple the flip lock lever 402 to the collar 410. For example, the bolt 404 may pass through a first hole in the collar 410, then pass through the length of the hole in the cam mechanism portion of the flip lock lever 402, and then pass through a second hole on an opposite side of the collar 410. Thus, the flip lock lever 402 may be attached to the collar 410.

Though FIG. 5 is shown with respect to outer leg 102, the examples shown are also reproduced with respect to middle leg 104. That is, the first nesting leg lock 114, coupled to a distal end of outer leg 102, and a second nesting leg lock 116, coupled to a distal end of middle leg 104, are comprised of substantially the same parts and features. While the sizes and shapes of the first and second nesting leg locks may differ, the locking mechanism remains similar.

The leg shim 408 may be coupled to an inside of the hollow portion of outer leg 102. The leg shim 408 may have smaller cross-sectional dimensions than the outer leg 102 to allow for the leg shim 408 to couple to the inside of outer leg 102, but the leg shim 408 may have larger cross-sectional dimensions than the middle leg 104. Thus, the leg shim 408 may be attached to the inside of the hollow portion of outer leg 102, and the middle leg 104 may be slid into the inside of the leg shim 408. Thus, the middle leg 104 can slide into the hollow portion of outer leg 102 and the leg shim 408 may sit in between the outer leg 102 and the middle leg 104. The leg shim 408 may comprise a rectangular cut-out hole, seen partially on the backside of the leg shim 408 in FIG. 5. Additionally, leg shim 408 comprises a slit and/or seam cut-out on the backside of the leg shim 408. The slit cut-out may allow for the leg shim 408 to flex slightly. The slit cut-out may improve the ease of sliding the leg shim 408 inside the hollow portion of the outer leg 102. Though the rectangular cut-out hole in the leg shim 408 is shown to be rectangular, the hole may comprise any shape, such as a circle, a square, a triangle, an oval, or the like.

The backside of the latch shim 406 shown in FIG. 5 shows that, in an example, the backside of the latch shim 406 is flat. The latch shim 406 may comprise a rectangular piece of material. The material may be metal, plastic, ceramic, or any other suitable material. The latch shim may be flat on the backside, and the latch shim 406 may be concave on the front side opposite the backside.

The collar 410 may be coupled to the outside of the outer leg 102. The collar 410 may have a large cut-out section on a face associated with the hole 102a, neither of which are shown in FIG. 5. The collar may not have a cut-out section on a backside of the collar.

Figure 6:
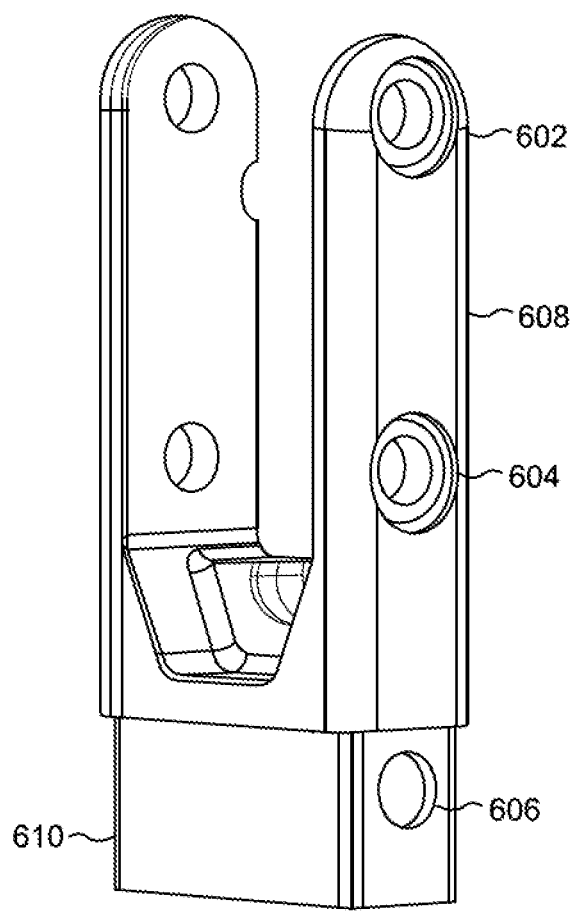
FIG. 6 shows a top connector of a leg of a tripod in accordance with one or more implementations.

FIG. 6 shows an example top connector 600. The top connector 600 may couple with a proximal end of the outer leg 102 at narrow section 610, and the top connector may connect, via a bolt (not shown), with the hub 110. The top connector may couple to the hub 110 via a bolt through hole 602, for example. The top connector may comprise the narrower section 610 that is configured to sit within the hollow portion of the proximal end of outer leg 102. A bolt may be configured to pass through hole 606 and through a corresponding hole in the proximal end of the outer leg 102 to secure the top connector 600 to the outer leg 102. The top connector may comprise additional holes 604. The additional hole may be configured to connect to a top latch (shown in FIG. 7), described in more detail herein. The top connector 600 comprises arms 608. The arms 608 may provide a space in between the arms 608 for the top latch.

Figure 7:
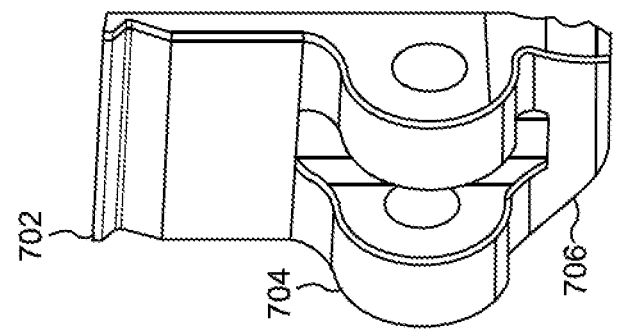
FIG. 7 shows a top latch of a leg of a tripod in accordance with one or more implementations.
Figure 7:
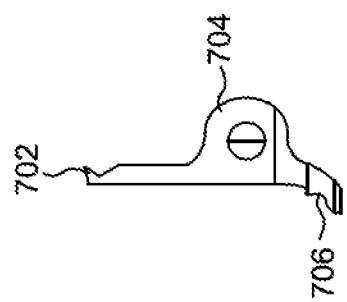
Figure 7:
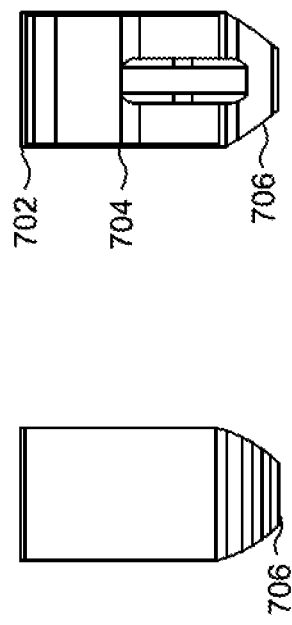
Figure 7:
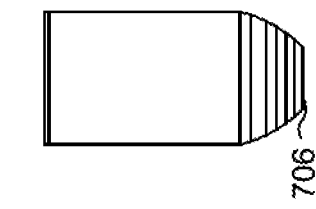

FIG. 7 shows an example of the top latch described previously. The top latch 700 comprises a locking tooth 702, bolt hole connectors 704, and a lever 706. The top latch may be coupled to the top connector via the bolt hole connectors 704. A bolt (not shown) may traverse the additional hole 604 in the top connector 600 and the bolt may traverse the bolt hole connectors 704, coupling the top latch 700 to the top connector 600. In one example, the space between the two bolt hole connectors 704 may comprise a spring assembly (not shown), to provide tension to the top latch 700. While tensioned, the locking tooth 702 may engage a corresponding gear tooth 802 (shown in FIG. 8) in the hub 110 (described herein). In an example, while the locking tooth 702 is engaged with the gear tooth 802 in the hub 110, the entire leg may be locked in place. In one example, a user may depress the lever 706, which may disengage the locking tooth 702 from the gear tooth 802 in the hub 110, allowing the entire leg of the tripod to move freely with respect to the joint created with hole 602 in the top connector and the hub 110. For example, the tripod 100 may be in a collapsed configuration (e.g., the telescoping legs fully retracted and each leg pushed together). The tripod leg may be prevented from articulating along the joint created between hole 602 in the top connector and the hub 110 unless the lever 706 is actively depressed to disengage the locking tooth 702. Thus, the tripod leg may only freely move along the joint created by hold 602 and the hub 110 while the lever 706 is depressed and the locking tooth 702 is disengaged. In tripods known in the art, typically a leg of the tripod may be freely moved from a collapsed position outward, without requiring the disengagement of a tooth and gear mechanism.

Figure 8:
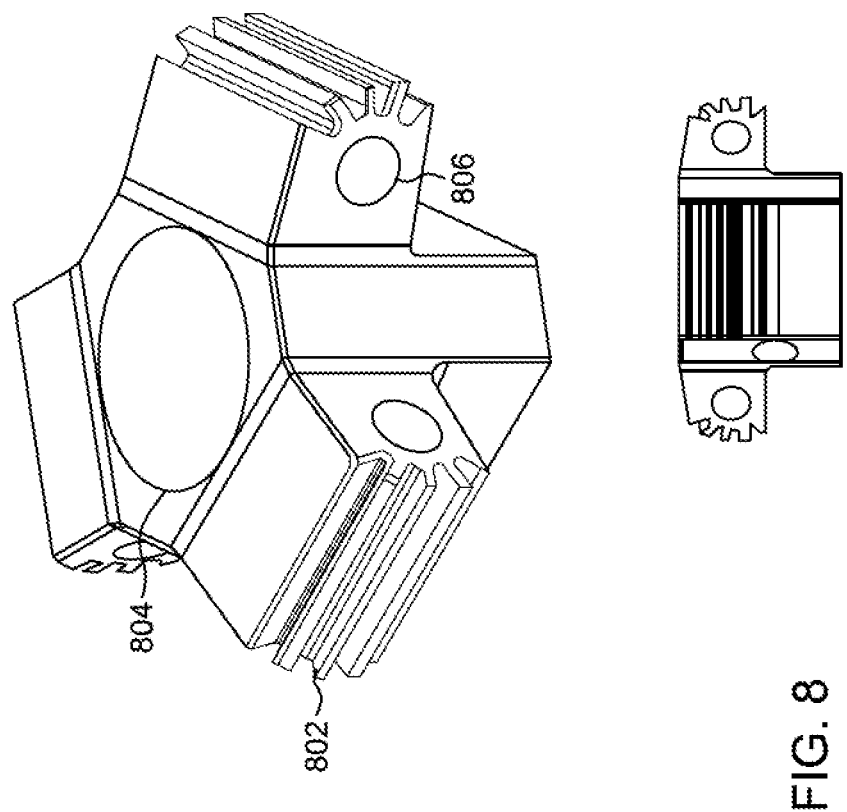
FIG. 8 shows a hub of a tripod in accordance with one or more implementations.
Figure 8:
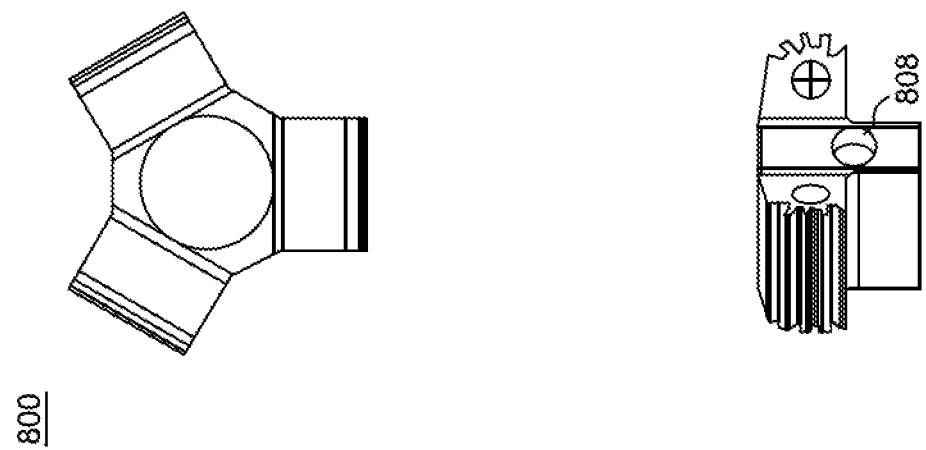

FIG. 8 shows an example hub 110. The example hub 110 comprises three leg connectors, corresponding to the three legs of the tripod. Though the hub 110 comprises three leg connectors, the hub may comprise any number of leg connectors, corresponding to any number of legs. In one example, each leg connector comprises one or more gear teeth 802. As described with respect to FIG. 7, the locking tooth 702 in the top latch 700 may be engaged, under tension, with one or more of the gear teeth 802, locking the corresponding leg in place. Center column hole 804 may extend through the entire body of the hub 110. The center column hole 804 may be configured to allow the center column 112 to couple to the hub 110. For example, the center column 112 may slide freely through the center column hole 804, or the center column 112 may be locked in place with respect to the center column hole 804. The center column locking hole 808 may, in one example, be associated with a pin. The pin may pass through the center column locking hole 808 and the pin may press against the center column 112. Friction from the pin pressing against the center column 112 may lock the center column 112 in place with respect to the hub 110. The pin in the center column locking hole may be tensioned via spring, the pin may be coupled to the center column locking hole via a threaded connection, or any other suitable means to allow the pin to lock the center column 112 into place. The pin may be a thumb screw. In one example, a leg connection hole 806 may be coupled, via a bolt, to hole 602 in the top connector to couple a leg to the hub 110.

Figure 9:
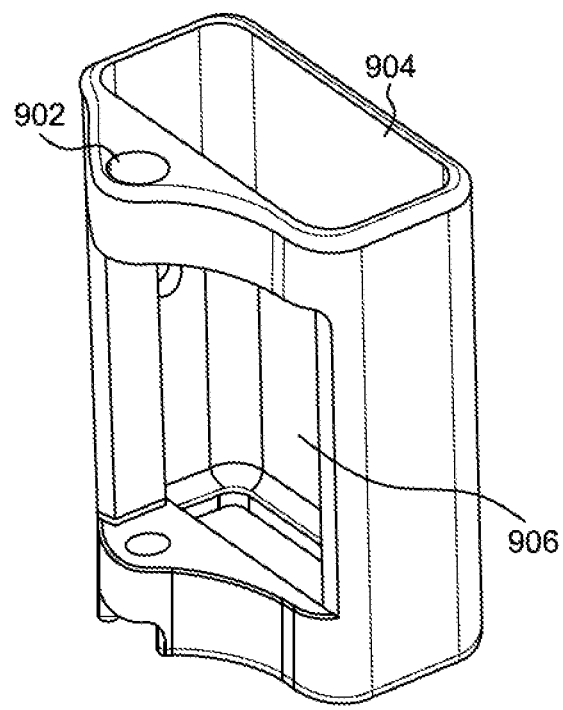
FIG. 9 shows a collar portion of a flip lock in accordance with one or more implementations.

FIG. 9 describes an example collar 410. The collar 410 may be coupled to a distal end of a hollow leg section. For example, the collar 410 may be coupled to the distal end of the outer leg 102, or the collar 410 may be coupled to a distal end of the middle leg 104. The collar may serve as a portion of the nesting flip lock, at least in part in combination with the flip lock lever 402. The collar may comprise a bolt hole 902, through which bolt 404 may pass through and through bolt hole 1002 (shown in FIG. 10) in the flip lock lever 402 to couple the flip lock lever 402 and the collar 410. Space 904 may extend vertically through the center of the collar, and the space 904 may comprise similar dimensions as the outside dimensions of a cross-section of a hollow leg section, for example the outer leg 102. Thus, the collar may be coupled to the outside of the hollow leg section. In the described example, the cut-out section 906 may provide access for the flip lock lever 402 to interact with the latch shim 406.

Figure 10:
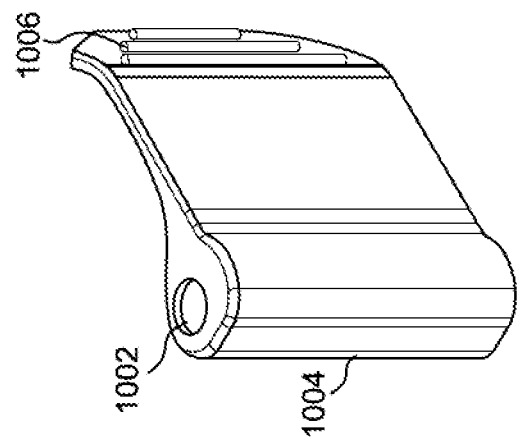
FIG. 10 shows a lever of a flip lock in accordance with one or more implementations.
Figure 10:
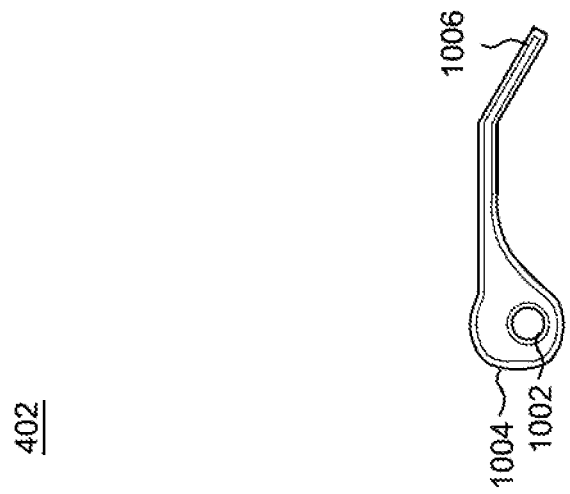

FIG. 10 describes an example flip lock lever 402. The flip lock lever 402 may comprise a bolt hole 1002 that passes through a barrel of a cam mechanism. The bolt hole 1002 may be associated with bolt 404 to couple the flip lock lever 402 to the collar 410. In an example, the bolt hole 1002 is offset from the center of the barrel of the cam mechanism 1004. In an example, the cam mechanism 1004 is an eccentric cam. The cam mechanism may provide a differential pressure against a leg shim 406 when the flip lock lever is in a first, engaged position and when the flip lock lever is in a second, disengaged position. For example, one side of the barrel may be flat, or substantially flat. The flat, or substantially flat, side may produce less pressure against the concave side of the latch shim. A second portion of the barrel of the cam mechanism 1004 may be rounded, or substantially rounded. The rounded portion of the cam mechanism 1004 may produce enough pressure against the concave side of the latch shim to compress the latch shim against the middle leg 104 and lock the middle leg 104 in place, for example.

The arm 1006 may be flat, the arm 1006 may be curved, the arm 1006 may be angled, or the any combination. In one example, the arm may be flat at a proximal portion to a barrel of a cam mechanism of the flip lock lever 402. The arm 1006 may be angled at a distal portion of the arm. In one example, the angled portion of the arm 1006 may match a position of a different leg not associated with the flip lock lever 402, such that the angled portion of the arm 1006 nests substantially against the different leg. The nested portion of the arm may reduce a chance that the arm snags against an item during transportation of the tripod.

Figure 11:
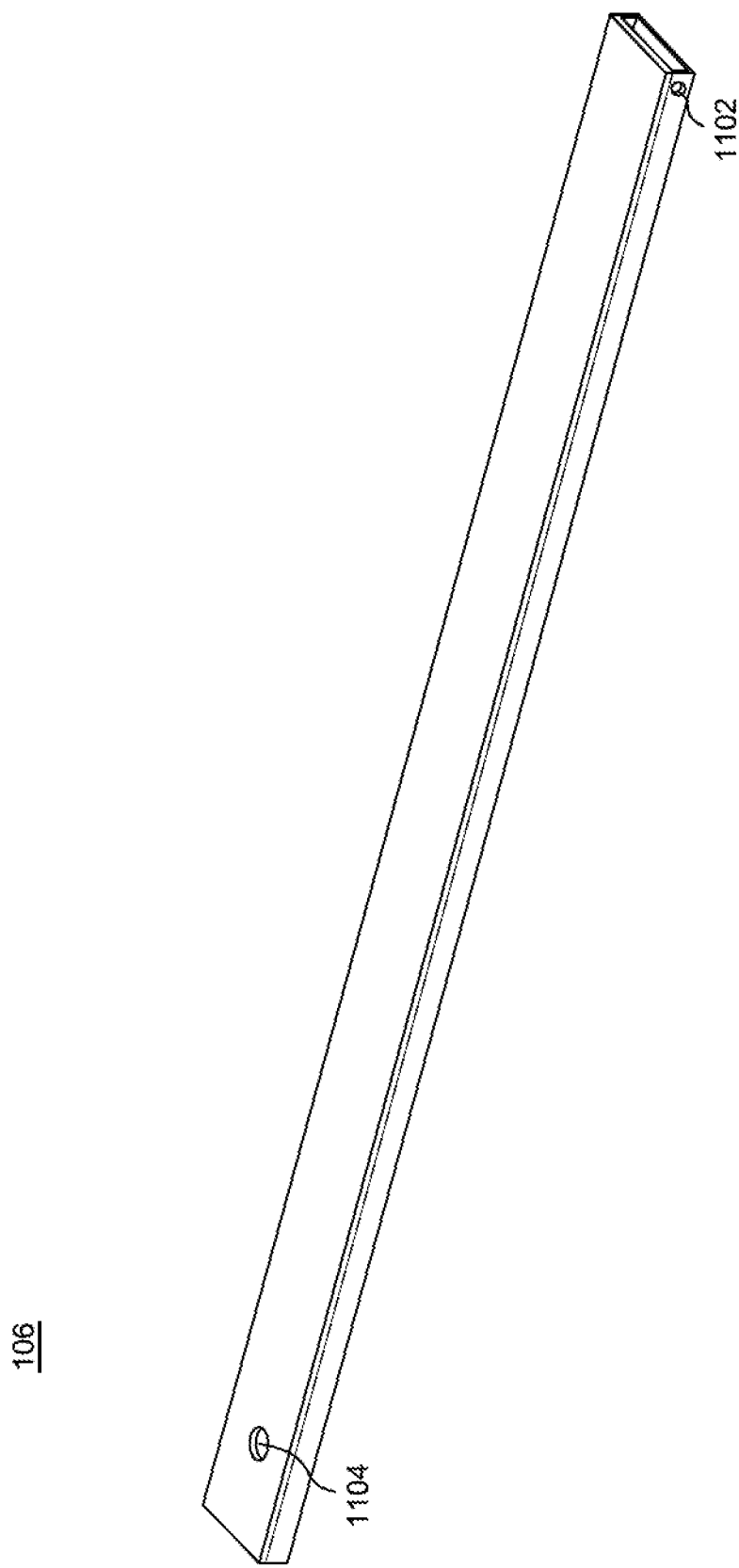
FIG. 11 shows a first hollow leg section in accordance with one or more implementations.

FIG. 11 shows an example of inner leg 106. In one example, at a proximal end of the inner leg 106, two small holes are positioned, one on each side of the leg (only one hole is shown). The holes may couple a leg stopper (described herein with reference to FIG. 15). At a distal end of the inner leg 106, a larger hole 1104 may be configured to couple to a foot 108. The hole 1104 may be configured to couple any number of different foot types 108. Each foot type may be removable. For example, a rubber foot may be removably coupled to the inner leg 106 via hole 1104. If a user associated with the tripod 100 desires to switch the rubber foot 108 with a metal foot 108, the user may remove the rubber foot 108 and couple the metal foot 108 with the inner leg 106 via hole 1104. Though FIG. 11 describes the inner leg 106 as rectangular, the inner leg 106 may comprise any suitable shape. For example, the inner leg 106 may be circular, or the inner leg 106 may be non-circular (e.g., the inner leg may be any uniform shape, such as oval, triangular, square, trapezoidal, rhomboid, or the like).

Figure 12:
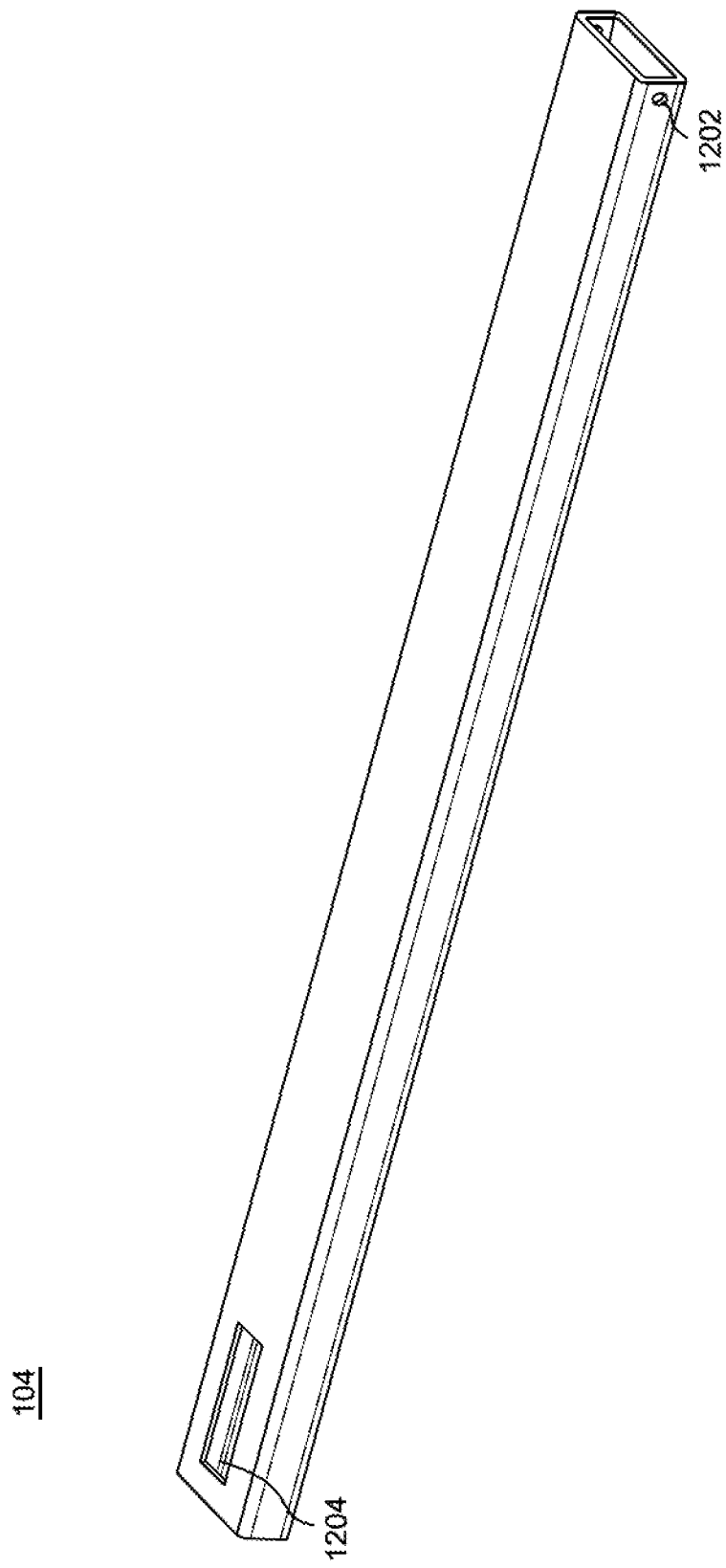
FIG. 12 shows a second hollow leg section in accordance with one or more implementations.

FIG. 12 describes an example middle leg 104. In one example, at a proximal end of the middle leg 104, two small holes are positioned, one on each side of the leg (only one hole is shown). The holes may be configured to couple a leg stopper (described herein with reference to FIG. 15). At a distal end of the middle leg 104, a rectangular cut-out hole 1204 is illustrated. In an example, the hole 1204 may be any suitable shape, such as a circle, triangle, square, or oval, or the like. In one example, the hole 1204 may be configured to house a latch shim 406, in a similar manner as described in FIG. 4. The hole 1204 may comprise at least a portion of the second nesting flip lock 116, wherein the second nesting flip lock 116 may comprise at least a collar 410, a flip lock lever 402, a bolt 404, a latch shim 406, and a leg shim 408. Though FIG. 12 describes the middle leg 104 as rectangular, the middle leg 104 may comprise any suitable shape. For example, the middle leg 104 may be circular, or the middle leg 104 may be non-circular (e.g., the inner leg may be any uniform shape, such as oval, triangular, square, trapezoidal, rhomboid, or the like).

Figure 13:
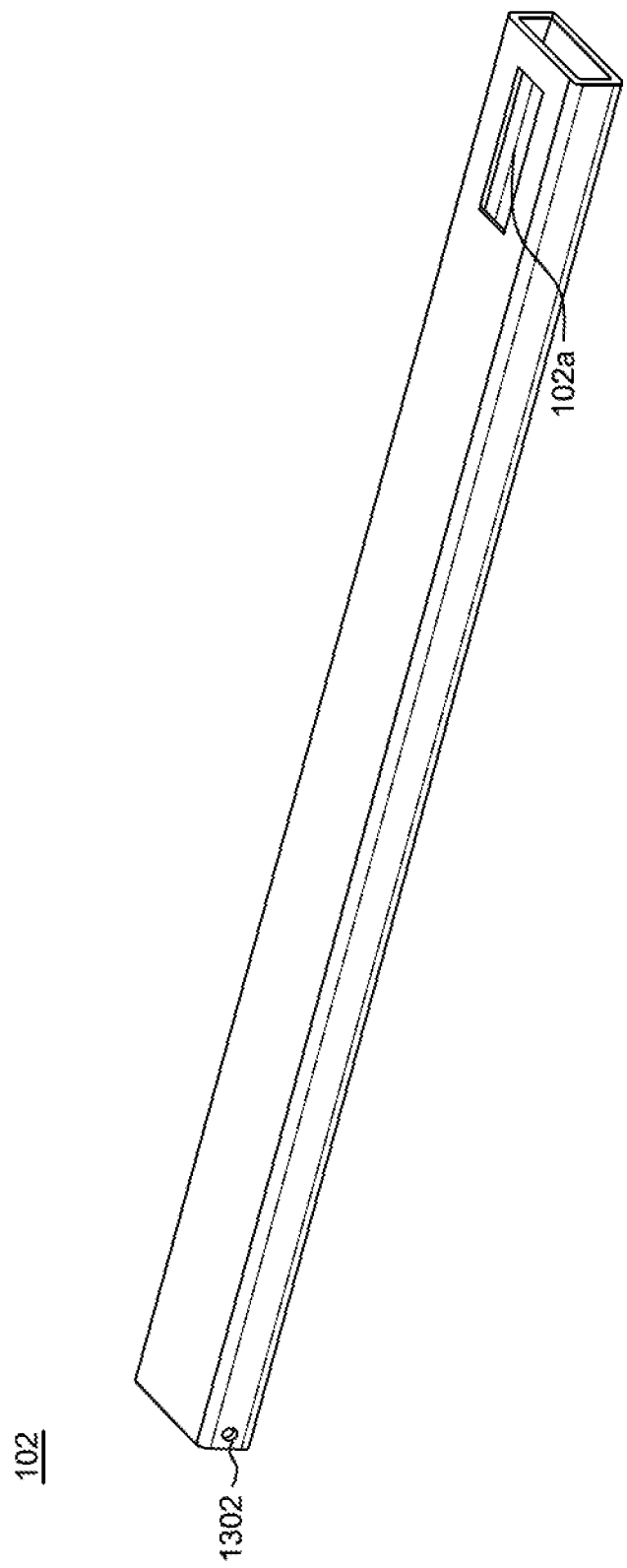
FIG. 13 shows a third leg section in accordance with one or more implementations.

FIG. 13 describes an example outer leg 102. In one example, at a proximal end of the outer leg 102, two holes are positioned, one on each side of the leg (only one hole is shown). The holes 1302 may be configured to couple a bolt (not shown), and the bolt may pass through a corresponding hole 606 in the top connector 600. At a distal end of the outer leg 102, a rectangular cut-out hole 102a is described. In an example, the hole 102a may be any suitable shape, such as a circle, triangle, square, or oval, or the like. In one example, the hole 102a may be configured to house a latch shim 406, in a similar manner as described in FIG. 4. The hole 102a may comprise at least a portion of the first nesting flip lock 114, wherein the first nesting flip lock 114 may comprise at least a collar 410, a flip lock lever 402, a bolt 404, a latch shim 406, and a leg shim 408. Though FIG. 13 describes the outer leg 102 as rectangular, the outer leg 102 may comprise any suitable shape. For example, the outer leg 102 may be circular or the outer leg 102 may be non-circular (e.g., the inner leg may be any uniform shape, such as oval, triangular, square, trapezoidal, rhomboid, or the like).

Figure 14:
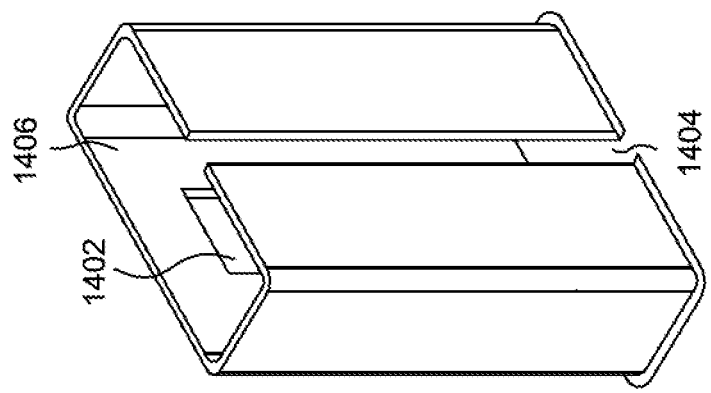
FIG. 14 shows a leg shim in accordance with one or more implementations.
Figure 14:
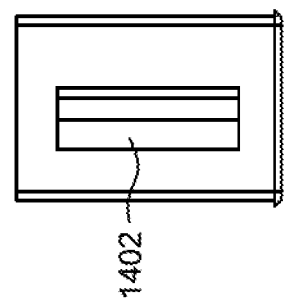
Figure 14:
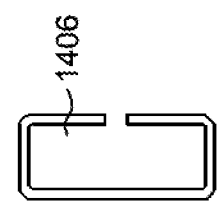
Figure 14:
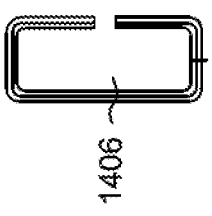
Figure 14:
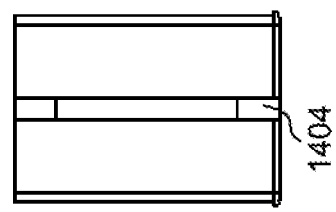

FIG. 14 shows an example leg shim, as described herein. The leg shim is described above with respect to FIG. 4. Additionally, in one example, the leg shim comprises a rectangular cut-out hole 1402. The hole 1402 may be associated with a similar location as hole 102a in outer leg 102, for example. The leg shim 408 may be configured to be coupled to the inside hollow portion of the outer leg 102, in an example. The hole 102a in the outer leg and the hole 1402 in the leg shim may comprise a latch shim hole. The latch shim 406 may be freely seated within the hole created by hole 102a and hole 1402. In one example, the leg shim may comprise a slit 1404. The slit 1404 may be configured to provide flexibility to the leg shim 408. The flexibility provided by slit 1404 may improve the ease of placing the leg shim 408 inside the hollow portion of the outer leg 102, for example. Additionally, the cross-section of the leg shim 408 is hollow 1406. The hollow cross-section allows for another leg section, for example, middle leg 104, to pass through the leg shim 408. For example, middle leg 104 may slide freely through the hollow cross-section 1406 while the first nesting flip lock 114 is disengaged.

Figure 15:
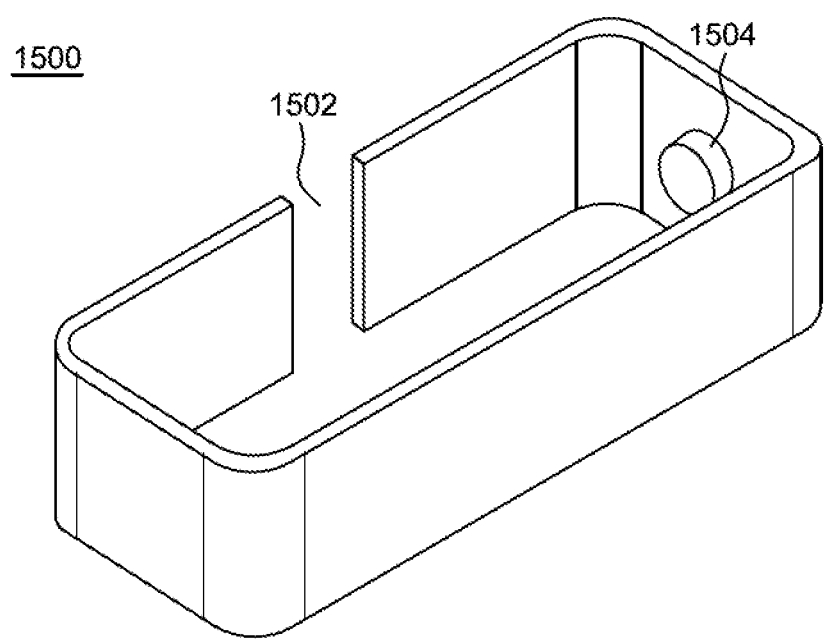
FIG. 15 shows a leg stopper in accordance with one or more implementations.

FIG. 15 shows an example leg stopper 1500. The leg stopper may be coupled to one or more hollow leg sections. For example, the leg stopper may comprise pin 1504 and a similar pin (not shown) on the opposite inner wall of the leg stopper 1500. In one example, the pin 1504 and the not shown pin may engage with any one of holes 1102 or 1202, associated with inner leg 106 and middle leg 104, respectively. The leg stopper 1500 also comprises a slit 1502. The slit provides flexibility to the leg stopper 1500 and may, for example, improve the ease of coupling the leg stopper 1500 with any one or more of the inner leg 106 or the middle leg 104. The leg stopper 1500 may be positioned around the outer side of the cross-section of the hollow leg sections 106 and 104. In one example, a middle leg 104 may freely slide inside of the outer leg 102. Without any mechanism to arrest the middle leg's 104 motion, the middle leg 104 may fall out of the outer leg 102, potentially damaging the tripod 100. In one example, the leg stopper 1500 prevents the middle leg 104 from falling completely out of the outer leg 102 by impacting the leg shim 408. Thus, when the middle leg 104 reaches maximum extension, the leg stopper 1500 may be in contact with the leg shim 408, and the leg shim 408 may block the leg stopper 1500 from moving farther, preventing the middle leg 104 from falling out of the outer leg 102 completely.

Figure 16:
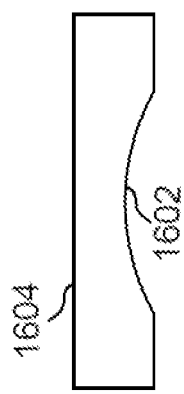
FIG. 16 shows a latch shim in accordance with one or more implementations.
Figure 16:
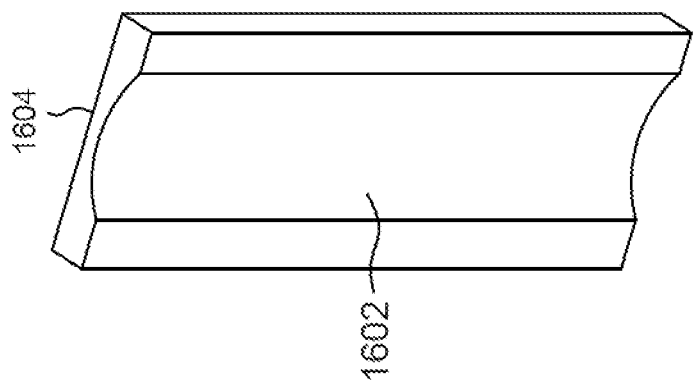

FIG. 16 shows an example latch shim 406. In one example, the latch shim 406 may freely float within the hole 102a associated with the outer leg 102 and the hole 1402 associated with the leg shim 408. The latch shim 406 may comprise a concave side 1602. As described with respect to FIG. 4, the concave side 1602 may face outward with respect to the middle of the hollow leg portion of outer leg 102. In an example, the concave side 1602 may be compressed by the cam mechanism of the nesting flip lock 114, and the compression against the concave side 1602 of the latch shim may cause the middle leg 104 to be locked in place. The side of the latch shim 406 opposite the concave side is a flat side 1604. The flat side may maximize a surface area between the latch shim 406 and the middle leg 104 when the latch shim 406 is compressed against the middle leg 104. While the example provided herein relates to outer leg 102, the first nesting flip lock 114, and the middle leg 104, the latch shim may be used in conjunction with any nesting flip lock associated with any of the hollow leg sections of the tripod 100.

What is claimed is:

1. A tripod device comprising:
   a hub; and
   a plurality of telescoping legs coupled, at a proximal end of each leg, to the hub, each leg of the plurality of legs further comprising:
   a plurality of hollow leg sections; and
   at least one flip-lock assembly, wherein the flip-lock assembly is coupled to a distal end of one hollow leg section of the plurality of hollow leg sections, the flip-lock assembly further comprising:
      a collar coupled to the distal end of the one hollow leg section, wherein the collar is configured to wrap around a perimeter of the one hollow leg section; and
      a lever configured to prevent snagging on environmental hazards by coupling, at a portion of the one hollow leg section that faces an opposing one of the plurality of telescoping legs, to the collar, wherein the lever is configured to move along a plane orthogonal to a telescoping movement of the telescoping legs, the lever further comprising:
         a cam mechanism to at least one of engage a flip-lock in a first position and disengage the flip-lock in a second position; and
         a bent tip configured to nest against an adjacent telescoping leg while the lever is in the first position.

2. The tripod of claim 1, wherein the cam mechanism comprises an eccentric cam.

3. The tripod of claim 1, wherein the plurality of hollow leg sections are non-circular.

4. The tripod of claim 1, further comprising a removable center column coupled to the hub, wherein the center column is configured to be fixed in place at a plurality of positions relative to the hub.

5. The tripod of claim 1, further comprising:
   a first portion of the hub comprising a plurality of teeth, wherein the first portion of the hub is associated with the coupling to a first telescoping leg of the plurality of telescoping legs; and
   a ratcheting lever coupled to the proximal end of the first telescoping leg, wherein the ratcheting lever is configured to engage at least one of the plurality of teeth to lock an angle of the first telescoping leg with respect to the hub.

6. The tripod of claim 1, wherein the flip-lock assembly is a first flip-lock assembly, further comprising a second flip-lock assembly coupled to a distal end of a different one of the plurality of hollow leg sections of each leg of the plurality of legs.

7. The tripod of claim 1, wherein the flip-lock assembly comprises a floating shim, and wherein the cam mechanism of the lever may engage the flip-lock by compressing the shim against a side of at least one of the hollow leg sections.

8. A tripod device comprising:
   a hub; and
   a plurality of non-circular, telescoping legs coupled, at a proximal end of each leg, to the hub, each leg of the plurality of non-circular telescoping legs further comprising:
   a plurality of hollow leg sections, wherein each leg section comprises a different size, and wherein at least a portion of a larger hollow leg section of the plurality of hollow leg sections may encapsulate at least a portion of a smaller hollow leg section of the plurality of hollow leg sections; and
   at least one flip-lock assembly, wherein the flip-lock assembly is coupled to a distal end of one hollow leg section of the plurality of hollow leg sections, the flip-lock assembly further comprising:
      a collar coupled to the distal end of the one hollow leg section, wherein the collar is configured to wrap around a perimeter of the one hollow leg section; and
      a lever configured to prevent snagging on environmental hazards by coupling, at a portion of the one hollow leg section that faces an opposing one of the plurality of telescoping legs, to the collar, wherein the lever is configured to move along a plane orthogonal to a telescoping movement of the telescoping legs, the lever further comprising:
         a cam mechanism to at least one of engage a flip-lock in a first position and disengage the flip-lock in a second position; and
         a bent tip configured to nest against an adjacent telescoping leg while the lever is in the first position.

9. The tripod of claim 8, wherein the cam mechanism comprises an eccentric cam.

10. The tripod of claim 8, further comprising a removable center column coupled to the hub, wherein the center column is configured to be fixed in place at a plurality of positions relative to the hub.

11. The tripod of claim 8, further comprising:
    a first portion of the hub comprising a plurality of teeth, wherein the first portion of the hub is associated with the coupling to a first telescoping leg of the plurality of telescoping legs; and
    a ratcheting lever coupled to the proximal end of the first telescoping leg, wherein the ratcheting lever is configured to engage at least one of the plurality of teeth to lock an angle of the first telescoping leg with respect to the hub.

12. The tripod of claim 8, wherein the flip-lock assembly is a first flip-lock assembly, further comprising a second flip-lock assembly coupled to a distal end of a different one of the plurality of hollow leg sections of each leg of the plurality of legs.

13. The tripod of claim 8, wherein the flip-lock assembly comprises a floating shim, and wherein the cam mechanism of the lever may engage the flip-lock by compressing the shim against a side of at least one of the hollow leg sections.

14. A tripod device comprising:
  a hub;
  a modular center column configured to detachably couple to the hub, further comprising:
    a mounting plate configured to couple an optical device at a first side of the plate, further comprising a first threaded connector at a second side of the plate opposite the first side of the plate;
    a tube comprising:
      a second threaded connector at a proximal end, the second threaded connector configured to couple to the first threaded connector; and
      a third threaded connector at a distal end; and
    a stabilization hook comprising, at a proximal end, a fourth threaded connector configured to couple to the third threaded connector, and further comprising, at a distal end, a hook; and
  a plurality of telescoping legs coupled, at a proximal end of each leg, to the hub, each leg of the plurality of telescoping legs further comprising:
    a plurality of hollow leg sections, wherein each leg section comprises a different size, and wherein at least a portion of a larger hollow leg section of the plurality of hollow leg sections may encapsulate at least a portion of a smaller hollow leg section of the plurality of hollow leg sections; and
    at least one flip-lock assembly, wherein the flip-lock assembly is coupled to a distal end of one hollow leg section of the plurality of hollow leg sections, the flip-lock assembly further comprising:
      a collar coupled to the distal end of the one hollow leg section, wherein the collar is configured to wrap around a perimeter of the one hollow leg section; and
      a lever configured to prevent snagging on environmental hazards by coupling, at a portion of the one hollow leg section that faces an opposing one of the plurality of telescoping legs, to the collar, wherein the lever is configured to move along a plane orthogonal to a telescoping movement of the telescoping legs, the lever further comprising;
        a cam mechanism to at least one of engage a flip-lock in a first position and disengage the flip-lock in a second position; and
        a bent tip configured to nest against an adjacent telescoping leg while the lever is in the first position.

15. The tripod of claim 14, wherein the cam mechanism comprises an eccentric cam.

16. The tripod of claim 14, wherein the plurality of hollow leg sections are circular.

17. The tripod of claim 14, wherein the plurality of hollow leg sections are non-circular.

18. The tripod of claim 14, further comprising:
  a first portion of the hub comprising a plurality of teeth, wherein the first portion of the hub is associated with the coupling to a first telescoping leg of the plurality of telescoping legs; and
  a ratcheting lever coupled to the proximal end of the first telescoping leg, wherein the ratcheting lever is configured to engage at least one of the plurality of teeth to lock an angle of the first telescoping leg with respect to the hub.

19. The tripod of claim 14, wherein the flip-lock assembly is a first flip-lock assembly, further comprising a second flip-lock assembly coupled to a distal end of a different one of the plurality of hollow leg sections of each leg of the plurality of legs.

* * * * *